(12) United States Patent
Fuchiwaki et al.

(10) Patent No.: US 10,436,598 B2
(45) Date of Patent: Oct. 8, 2019

(54) NAVIGATION SYSTEM AND NAVIGATION DEVICE

(71) Applicant: HONDA MOTOR CO., LTD., Minato-ku, Tokyo (JP)

(72) Inventors: Yosuke Fuchiwaki, Tokyo (JP); Nobuaki Asahara, Beijing (CN); Atsuyuki Suzuki, Utsunomiya (JP); Yusuke Nakamura, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/742,937

(22) PCT Filed: Jun. 2, 2016

(86) PCT No.: PCT/JP2016/066437
§ 371 (c)(1),
(2) Date: Jan. 9, 2018

(87) PCT Pub. No.: WO2017/018052
PCT Pub. Date: Feb. 2, 2017

(65) Prior Publication Data
US 2019/0072406 A1    Mar. 7, 2019

(30) Foreign Application Priority Data

Jul. 30, 2015  (JP) .................. 2015-150523

(51) Int. Cl.
*G01C 21/36* (2006.01)
*G08G 1/0968* (2006.01)
(Continued)

(52) U.S. Cl.
CPC ......... *G01C 21/3629* (2013.01); *G01C 21/36* (2013.01); *G01C 21/3661* (2013.01);
(Continued)

(58) Field of Classification Search
CPC ............ G01C 21/3629; G01C 21/3661; G08G 1/096872; G08G 1/0969
(Continued)

(56) References Cited

U.S. PATENT DOCUMENTS

| 9,304,000 B2* | 4/2016 | Yamaguchi ............ G01C 21/20 |
| 2003/0069686 A1* | 4/2003 | Watanabe ............... G01C 21/20 |
| | | 701/409 |

(Continued)

FOREIGN PATENT DOCUMENTS

| JP | 2003-244343 | 8/2003 |
| JP | 2006-227846 | 8/2006 |

(Continued)

OTHER PUBLICATIONS

International Search Report for International Patent Application No. PCT/JP2016/066437 dated Sep. 6, 2016, 2 pages.

*Primary Examiner* — Marthe Y Marc-Coleman
(74) *Attorney, Agent, or Firm* — Amin, Turocy & Watson LLP

(57) ABSTRACT

Whether route guidance information output from a navigation device to which an external device is connectable is provided by a navigation function of the external device or by that of the navigation device is able to be identified. A navigation device (100) that outputs route guidance information to HMI devices (104) to (110) and an external device (102) having a navigation function connected to the navigation device are included. The navigation device includes an external device detection means (322) that detects an input from the external device and an output control means (324) that controls output of route guidance information to the HMI devices. When the external device detection means has detected an input from the external device, the output control means outputs route guidance information provided by the navigation function included in the external device to (Continued)

the HMI devices in an output mode different from when route guidance information is output to the HMI devices by a navigation function included in the navigation device.

12 Claims, 8 Drawing Sheets

(51) Int. Cl.
    *G08G 1/0969*     (2006.01)
    *G06F 3/0481*     (2013.01)
    *G09B 29/10*     (2006.01)

(52) U.S. Cl.
    CPC ......... *G06F 3/0481* (2013.01); *G08G 1/0969* (2013.01); *G08G 1/096872* (2013.01); *G09B 29/10* (2013.01)

(58) Field of Classification Search
    USPC .......................................................... 701/428
    See application file for complete search history.

(56) References Cited

U.S. PATENT DOCUMENTS

| | | | | |
|---|---|---|---|---|
| 2010/0138149 | A1* | 6/2010 | Ohta | G01C 21/26 |
| | | | | 701/533 |
| 2013/0030689 | A1* | 1/2013 | Yamaguchi | G01C 21/20 |
| | | | | 701/409 |
| 2014/0092047 | A1* | 4/2014 | Nara | G01C 21/3688 |
| | | | | 345/173 |

FOREIGN PATENT DOCUMENTS

| | | | |
|---|---|---|---|
| JP | 2006227846 A | * | 8/2006 |
| JP | 2010-038589 | | 2/2010 |
| JP | 2010038589 A | * | 2/2010 |
| JP | 2010-261803 | | 11/2010 |
| WO | 2012141294 | | 10/2012 |

\* cited by examiner

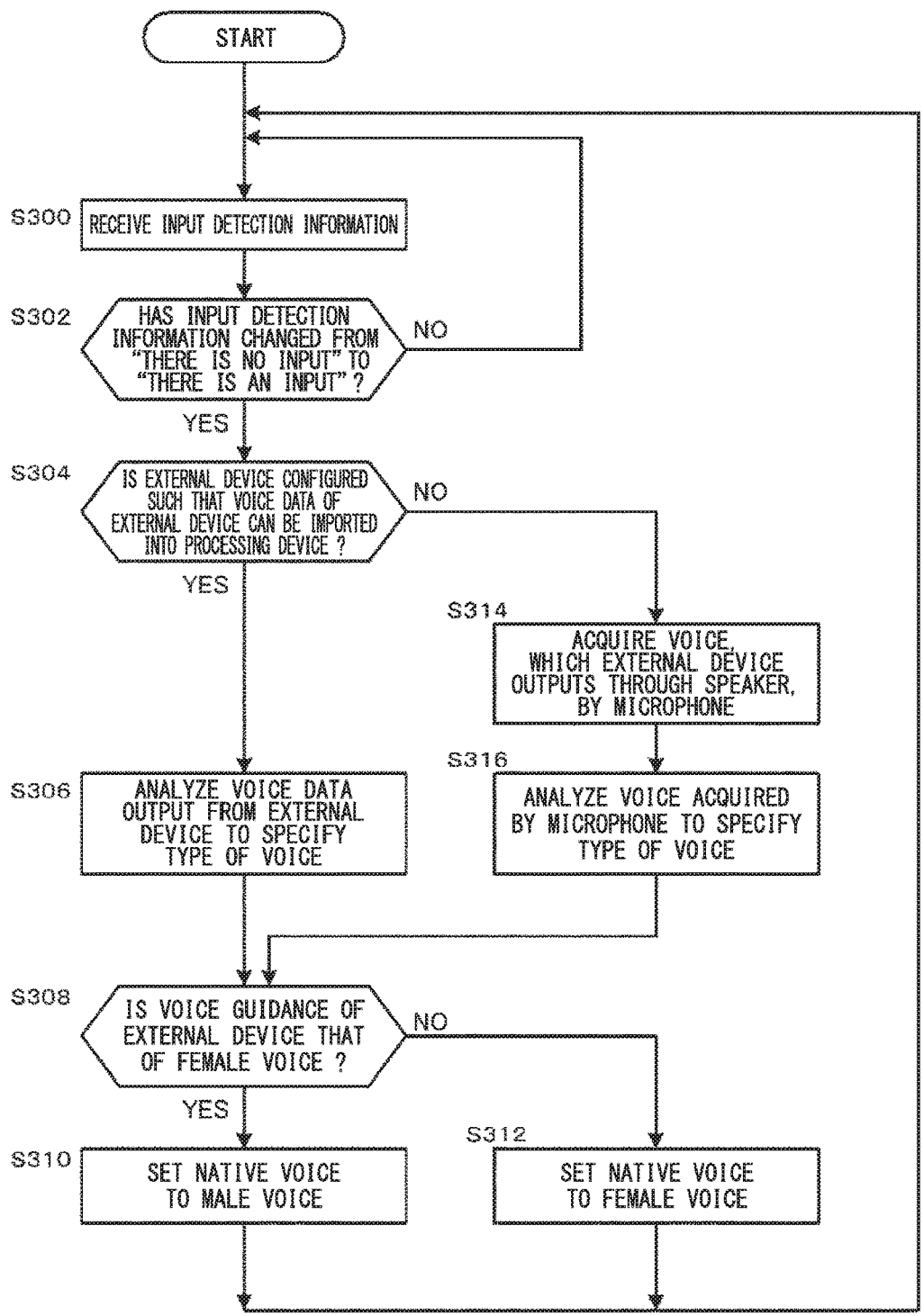

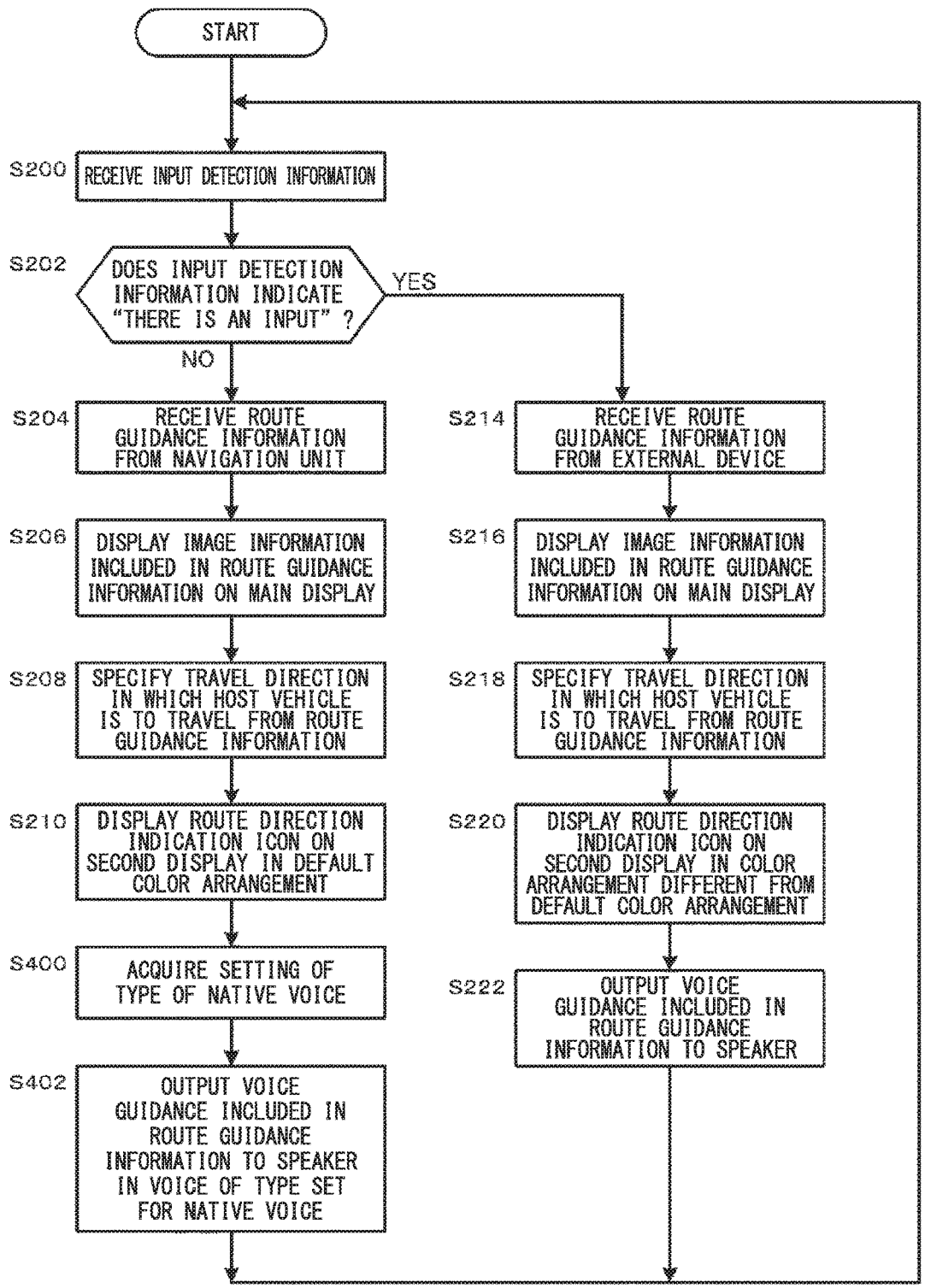

NAVIGATION SYSTEM AND NAVIGATION DEVICE

TECHNICAL FIELD

The present invention relates to a navigation system including an in-vehicle navigation device and an external device connected to the navigation device, and particularly to a navigation system, which can easily identify whether a navigation function included in an in-vehicle navigation device or a navigation function included in an external device is being performed, and a navigation device used in the navigation system.

BACKGROUND ART

A navigation device which provides a vehicle driver with route information for a destination or the like may sometimes have a so-called head unit function which allows functions of an external device such as a smartphone to be used through a display device or a speaker (a so-called human-machine interface (HMI) device) included in the navigation device when the external device is connected to the navigation device.

By connecting a user's smartphone to a navigation device having such a head unit function via an information communication bus such as a USB, it is possible to use, for example, a navigation function provided by the connected smartphone executing an application/program instead of a navigation function of the navigation device.

This allows the user to selectively utilize a familiar smartphone or the in-vehicle navigation device according to applications and preferences. However, new problems may arise since the same (or the same type of) "navigation function" may be able to be used through a plurality of devices (including the in-vehicle navigation device and the smartphone).

For example, when a driver, i.e., a user, uses his or her smartphone with a destination set therein by connecting it to an in-vehicle navigation device having a head unit function after setting another destination in the in-vehicle navigation device and starting navigation with the in-vehicle navigation device, it is difficult for the user to immediately determine whether route guidance information (navigation information) currently provided from the in-vehicle navigation device is route guidance information for the destination set in the navigation device or route guidance information for the destination set in the smartphone, which may cause confusion or uneasiness in the user.

In-vehicle GPS devices used in in-vehicle navigation devices and GPS devices used in smartphones often have different positioning accuracies. In general, in-vehicle GPS devices are more accurate. The accuracy and update frequency of map information used to generate route information or the like are also often different between an in-vehicle navigation device and a smartphone. Since there is a difference in the accuracy of route guidance information between an in-vehicle navigation device and a smartphone, when using the smartphone by connecting it to the in-vehicle navigation device as described above, the user may misread the accuracy of route information, leading to deviation from the target route, even if the same destination has been set in both the in-vehicle navigation device and the smartphone if it is not possible to identify which of the in-vehicle navigation device and the smartphone is outputting route guidance information.

Further, when the user desires to order inspection or repair of a navigation function that has been used due to a malfunction occurring therein, the user cannot specify the device of which he or she should order inspection or repair to correct the malfunction and also cannot correctly select a repairer to be ordered if it is not possible to identify whether the navigation function of the in-vehicle navigation device or the navigation function of the smartphone was being used at the time of occurrence of the malfunction.

Therefore, it is necessary for the user to easily determine (identify) whether a navigation function included in an in-vehicle navigation device or a navigation function included in a smartphone is being used.

An in-vehicle device which communicates with a mobile phone and displays display data that is being displayed on a screen of the mobile phone on an in-vehicle display device is known in the art (Patent Literature 1). Here, it can be assumed that, in the case in which the navigation device having the head unit function described above employs the configuration of this in-vehicle device, display data that is being displayed on the screen of the smartphone is displayed on the in-vehicle display when the navigation function of the smartphone is used and display data of the navigation function included in the in-vehicle navigation device is displayed on the in-vehicle display when the in-vehicle navigation device is used. In this case, it is possible to identify whether the device currently used for navigation is the in-vehicle navigation device or the smartphone from the difference in the display screen displayed on the in-vehicle display.

However, if the devices provide the same or the same type of navigation function even if the devices providing the navigation function are different, a lot of common information such as "map information" and "route display" is displayed on the display, which may make such identification difficult at a glance. Furthermore, in general, an in-vehicle display having a screen size suitable for displaying map information or the like is often disposed at the center of a dashboard and it is difficult for the driver to identify slight differences in the display screen by turning his or her gaze to such an in-vehicle display disposed at the center of the dashboard, which is also undesirable from the viewpoint of safe driving.

A navigation system which displays icons indicating route change directions according to route guidance information (i.e., performs so-called turn-by-turn display) on the screen of an instrument such as a speedometer which is easily seen by the driver at a timing before route change is needed is also known (Patent Literature 2).

However, since the route change display is provided in the form of icons in this system, when the system is applied to an environment in which route guidance information can be provided by a plurality of different devices such as an in-vehicle navigation device and a smartphone, it is very difficult to identify, from the route change display provided in the form of icons, which device has provided the route guidance information on which the route change display is based.

CITATION LIST

Patent Literature

[Patent Literature 1]
    Japanese Unexamined Patent Application, First Publication No. 2003-244343

[Patent Literature 2]

Japanese Unexamined Patent Application, First Publication No. 2010-261803

SUMMARY OF INVENTION

Technical Problem

In view of the above background, in a navigation device that outputs route guidance information to a human-machine interface (HMI) device or in a navigation system which includes the navigation device and an external device having a navigation function connected to the navigation device, there is a need for the user to be able to easily specify which of the navigation functions of the navigation and external devices is currently outputting route guidance information to the HMI device.

Solution to Problem

One aspect of the present invention provides a navigation system including a navigation device configured to output route guidance information to a human-machine interface (HMI) device, and an external device having a navigation function connected to the navigation device, the navigation device including an external device detection unit configured to detect an input from the external device, and an output control unit configured to control output of route guidance information to the HMI device, wherein the output control unit is configured to selectively output route guidance information provided either by a navigation function included in the navigation device or by the navigation function included in the external device to the HMI device, and when the external device detection unit has detected an input from the external device, the output control unit is configured to output route guidance information provided by the navigation function included in the external device to the HMI device in an output mode different from when route guidance information is output to the HMI device by the navigation function included in the navigation device.

According to another aspect of the present invention, the HMI device includes a display device, the route guidance information includes a direction guidance display for a travel direction of an own vehicle, the output mode is a display color used to display the direction guidance display on the display device, and the output control unit is configured to display the direction guidance display provided by the navigation function included in the external device on the display device using a color different from when the direction guidance display provided by the navigation function included in the navigation device is output to the display device.

According to another aspect of the present invention, the HMI device includes a speaker, the route guidance information includes voice guidance concerning a route to a destination, the output mode is a type of voice used to output the voice guidance to the speaker, and the output control unit is configured to output the voice guidance provided by the navigation function included in the external device to the speaker using a voice of a different type from when the voice guidance provided by the navigation function included in the navigation device is output to the speaker.

According to another aspect of the present invention, the navigation device includes a voice determination unit configured to determine a type of voice of the voice guidance output by the external device connected to the navigation device, and when the output control unit outputs the voice guidance to the speaker through the navigation function included in the navigation device after the voice determination unit has determined a type of voice of the voice guidance output by the external device upon connection of the external device to the navigation device, the output control unit is configured to output the voice guidance to the speaker in a voice of a different type from the determined type of voice of the voice guidance output by the external device.

According to another aspect of the present invention, the HMI device includes a microphone, and the voice determination unit is configured to detect the voice guidance, which the external device connected to the navigation device outputs through the speaker, by the microphone and to determine that a type of voice of the detected voice guidance is a type of voice of the voice guidance output by the external device.

Another aspect of the present invention provides a navigation device having a function of selectively outputting a navigation function included in an external device connected to the navigation device and a navigation function included in the navigation device to a human-machine interface (HMI) device, the navigation device including an external device detection unit configured to detect an input from the external device, and an output control unit configured to control output of route guidance information to the HMI device, wherein the output control unit is configured to selectively output route guidance information provided either by a navigation function included in the navigation device or by the navigation function included in the external device to the HMI device, and when the external device detection unit has detected an input from the external device, the output control unit is configured to output route guidance information provided by the navigation function included in the external device to the HMI device in an output mode different from when route guidance information is output to the HMI device by the navigation function included in the navigation device.

Another aspect of the present invention provides a vehicle including the navigation system or the navigation device.

BRIEF DESCRIPTION OF DRAWINGS

FIG. 9 is a flowchart showing a procedure of a voice determination process of the navigation device shown in FIG. 8.

FIG. 10 is a flowchart showing a procedure of an output control process 2 of the navigation device shown in FIG. 8.

DESCRIPTION OF EMBODIMENTS

Hereinafter, embodiments of the present invention will be described with reference to the drawings.

First Embodiment

First, a navigation system according to a first embodiment of the present invention will be described.

Figure 1:
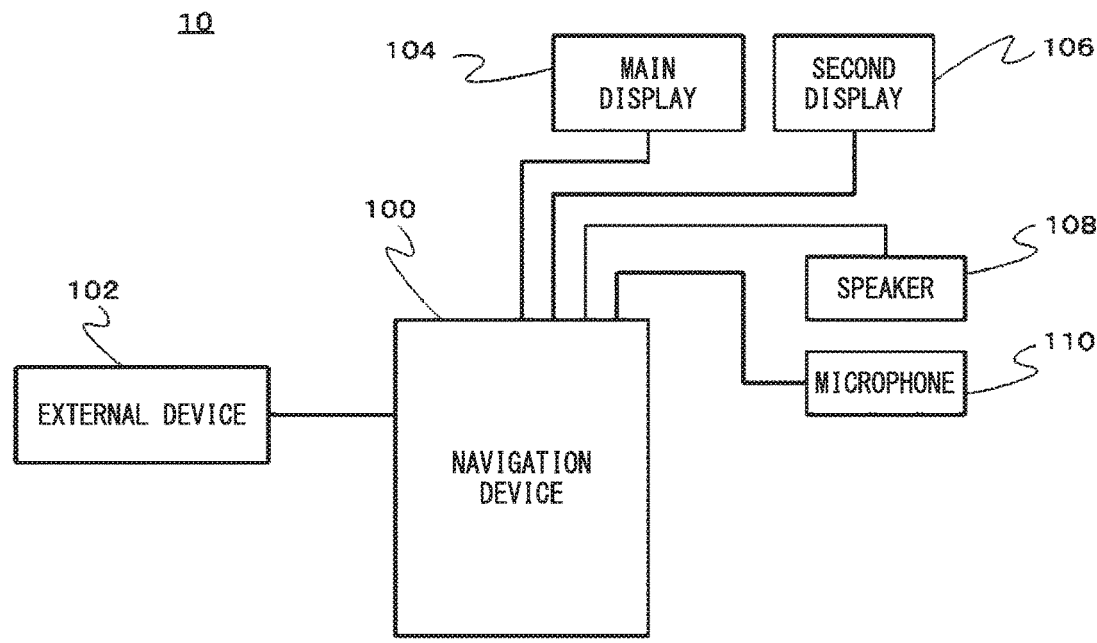
FIG. 1 is a diagram showing a configuration of a navigation system according to a first embodiment of the present invention.
Figure 2:
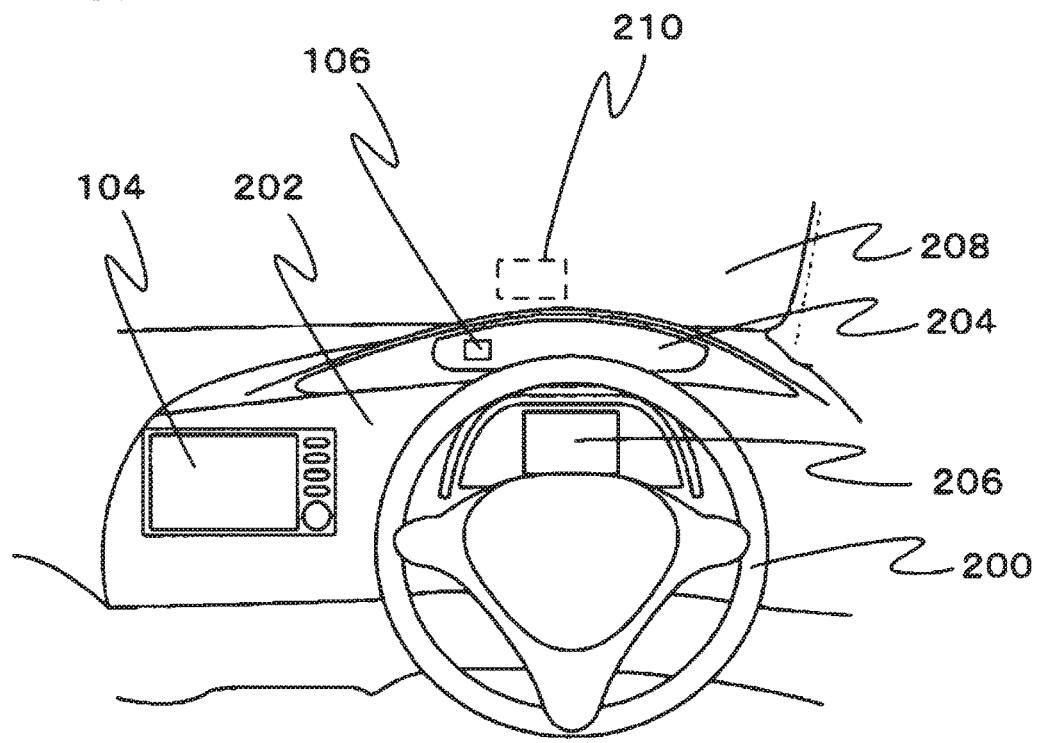
FIG. 2 is a diagram showing an exemplary arrangement of a display device in the vicinity of a driver's seat of a host vehicle.

FIG. 1 is a diagram showing a configuration of a navigation system according to the first embodiment of the present invention and FIG. 2 is a diagram showing an exemplary arrangement of a display device in the vicinity of a driver's seat of a host vehicle.

The navigation system 10 includes an in-vehicle navigation device 100, an external device 102, a main display 104, a second display 106, a speaker 108, and a microphone 110. The main display 104, the second display 106, the speaker 108, and the microphone 110 are human-machine interface (HMI) devices.

The navigation device 100, the main display 104, the second display 106, the speaker 108, and the microphone 110 are devices provided in the host vehicle and the external device 102 is a device which is connected to and used in the navigation device 100 at a user's request.

The main display 104 is formed of, for example, a liquid crystal display device and a touch panel or the like which is provided on a display screen of the liquid crystal display device, and the user can input a command or data to the navigation device 100 via the main display 104 and/or the microphone 110. The navigation device 100 operates on the basis of the input command and/or data, or outputs the command and/or data to the external device 102.

The external device 102 is, for example, a multi-functional mobile phone such as a smartphone or a portable information terminal device such as a portable PC. The external device 102 is connected to the navigation device 100, for example, via a communication bus according to a universal serial bus (USB) communication protocol or the like. The external device 102 includes, for example, a GPS device, a processing device such as a CPU, a wireless device which can connect to the Internet via a telephone line or the like, and an HMI device such as a display provided with a touch panel or a speaker and implements various functions by the processing device executing various applications/programs. In the present embodiment, in particular, the external device 102 can provide a navigation function by executing one of such applications/programs and outputs, when the user sets or inputs a destination, route guidance information from the current position of the external device 102 (thus, the current position of the host vehicle) to the destination. The setting of the destination and the output of the route guidance information can be performed via the HMI device included in the external device 102. In addition, when the external device 102 is connected to the navigation device 100, the setting of the destination and the output of the route guidance information can be performed via the navigation device 100 and the HMI device such as the main display 104 or the speaker 108 connected to the navigation device 100.

The main display 104 is a display device that displays detailed route guidance information including a map screen generated by the navigation function of the navigation device 100 or a map screen that the navigation device 100 has received from the external device 102 and is disposed at a position at which operation is easy on a dashboard 202 at the left of a steering wheel 200 (see FIG. 2).

The second display 106 is provided at a position such that the driver can view display content of the second display 106 without looking far away from the road in front such that he or she can read the display content with a short glance time compared to the main display 104. More specifically, the second display 106 is provided, for example, in a speedometer 204 disposed on the dashboard 202 at a position near the steering wheel 200. Alternatively, a small display 206 provided on the dashboard 202 at a position which is not obstructed by spokes of the steering wheel 200 when seen from the driver sitting in the driver's seat or a head-up display (HUD) 210 projected on a front glass 208 may be used as the second display 106.

The navigation device 100 may provide all or part of the route guidance information generated by the navigation function included in the navigation device 100 or received from the external device 102 having the navigation function to the user via the main display 104, the second display 106, and/or the speaker 108 without alternation or after performing predetermined processing on it.

Figure 3:
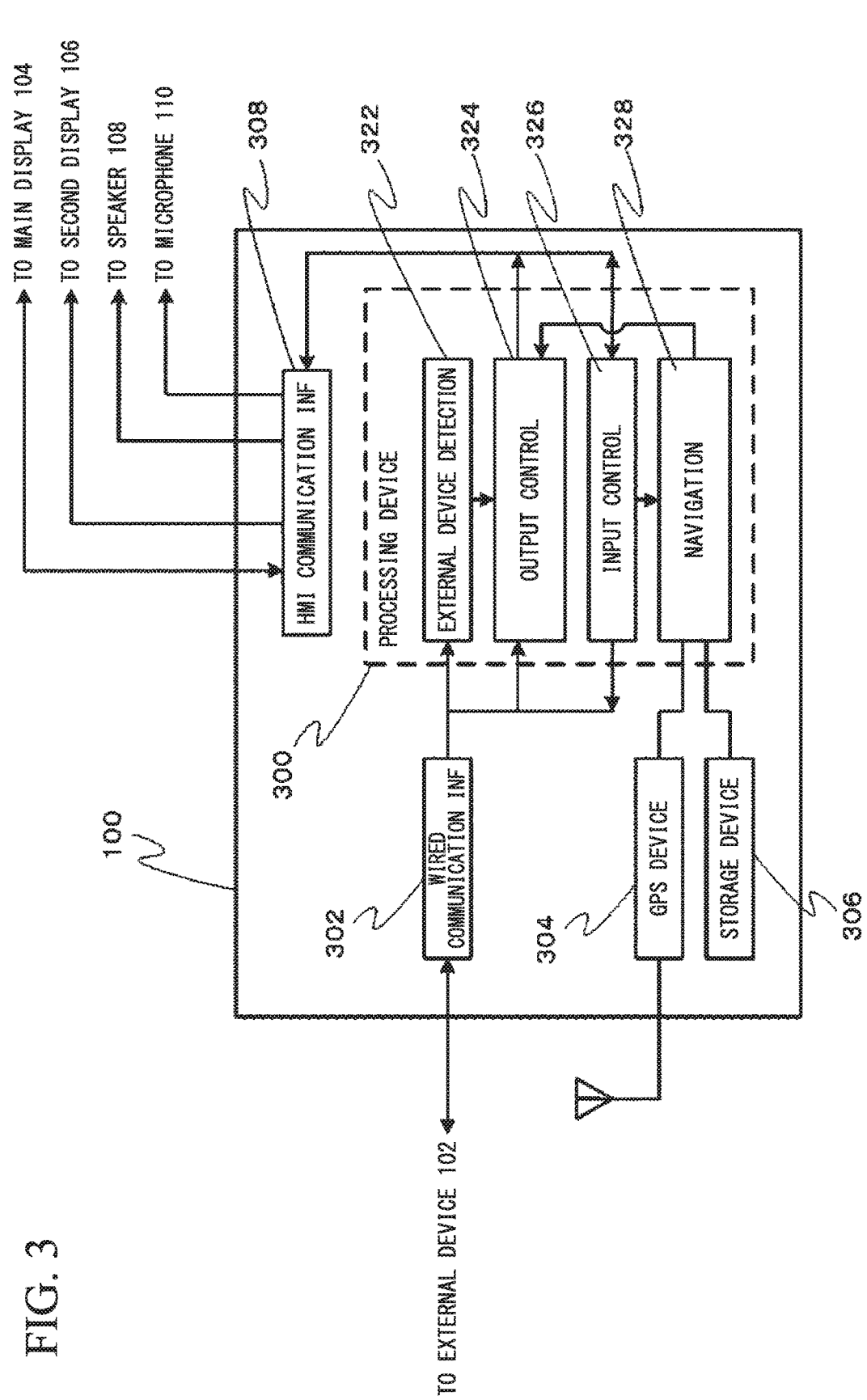
FIG. 3 is a diagram showing a configuration of a navigation device used in the navigation system shown in FIG. 1.

FIG. 3 is a diagram showing a configuration of the navigation device 100 used in the navigation system 10 shown in FIG. 1. The navigation device 100 includes a processing device 300, a wired communication interface (INF) 302, a GPS device 304, a storage device 306 for storing map information or the like, and an HMI communication interface (INF) 308.

The wired communication INF 302 is a communication interface for the navigation device 100 to exchange information with the external device 102 via a wired transmission path and may be, for example, an interface compliant with a communication protocol such as universal serial bus (USB) or controller area network (CAN).

The GPS device 304 is a device that outputs positioning information for specifying the current position of the host vehicle. For example, the GPS device 304 receives GPS signals including positioning data from a plurality of GPS satellites and calculates the latitude and longitude of the current position. The GPS device 304 may also receive radio waves transmitted by base stations of mobile phones in addition to GPS signals and calculate the latitude and longitude of the current position additionally on the basis of position information of the base stations.

The HMI communication INF 308 is an interface for communicating with HMI devices provided outside the navigation device 100, which include the main display 104, the second display 106, the speaker 108, and the microphone 110.

The processing device 300 is a computer having a processor such as a central processing unit (CPU), a read only memory (ROM) with a program written thereto, a random access memory (RAM) for temporarily storing data, and the like and includes an external device detection unit 322, an output control unit 324, an input control unit 326, and a navigation unit 328. Each of the units included in the processing device 300 is realized by the processing device 300, which is a computer, executing a program which can be stored in any computer-readable storage medium. Alternatively, all or some of the units may each be formed of hardware including one or more electronic circuit parts.

The external device detection unit 322 detects whether or not there is an input from the external device 102 by accessing the wired communication INF 302 and outputs input detection information indicating the detection result.

The output control unit 324 displays detailed route guidance including a map screen on the main display 104 on the basis of the route guidance information output by the navigation unit 328 which will be described later and also acquires a route direction in which the host vehicle is to travel from the route guidance information and displays a route direction indication icon, which is a symbol indicating the route direction, on the second display 106. That is, the route direction indication icon is a direction guidance display regarding the travel direction of the host vehicle (i.e., the own vehicle). When the route guidance information output by the navigation unit 328 includes voice guidance for a route to the destination, the output control unit 324 outputs the voice guidance to the speaker 108.

Further, when the external device 102 is connected to the navigation device 100 and an input is then received from the external device 102, the output control unit 324 displays detailed route guidance including a map screen on the basis of the route guidance information output from the external device 102 on the main display 104 and also acquires a route direction in which the host vehicle is to travel from the route guidance information and displays a route direction indication icon indicating the route direction on the second display 106. For example, the output control unit 324 displays an image relating to the route guidance information which the external device 102 outputs to the display device (display) which is an HMI device included in the external device 102 on the main display 104 without alteration of the image. When the route guidance information output by the external device 102 includes voice guidance for a route to the destination, the output control unit 324 outputs the voice guidance to the speaker 108. That is, the output control unit 324 can selectively output route guidance information provided either by the navigation function provided by the navigation unit 328 provided in the own device or by the navigation function included in the external device 102 to the HMI devices (that is, to the main display 104, the second display 106, and the speaker 108).

In particular, when the external device detection unit 322 has detected an input from the external device 102, the output control unit 324 outputs the route guidance information provided by the navigation function included in the external device 102 to the HMI devices in an output mode different from when the output control unit 324 outputs route guidance information to the HMI devices by the navigation function provided by the navigation unit 328 included in the navigation device.

More specifically, in the present embodiment, the output mode is a color arrangement (or a display color) of the route direction indication icon which is a direction guidance display displayed on the second display 106 and the output control unit 324 displays a route direction indication icon based on the navigation function included in the external device 102 on the second display 106 using a color different from when the output control unit 324 displays a route direction indication icon on the second display 106 by the navigation function provided by the navigation unit 328 included in the navigation device.

Figure 4:
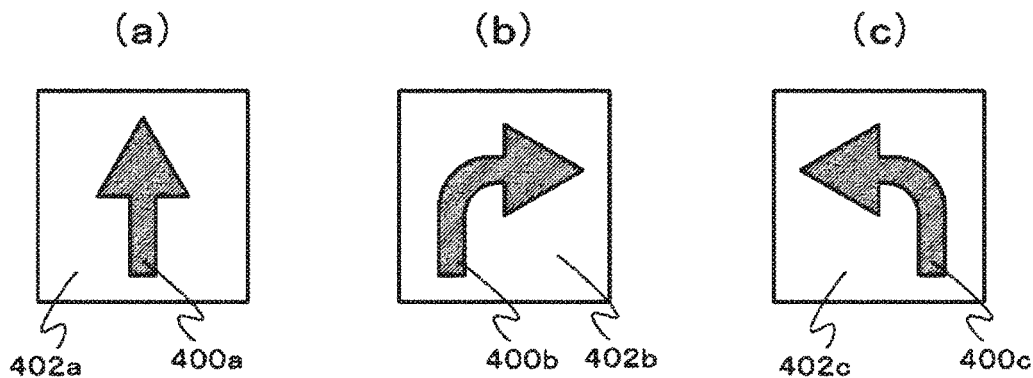
FIG. 4 is a diagram showing examples of route direction indication icons displayed on a second display in the navigation system shown in FIG. 1.

FIGS. 4(a), 4(b), and 4(c) are diagrams showing examples of route direction indication icons displayed on the second display 106. An icon shown in FIG. 4(a), 4(b), or 4(c) can be displayed on the second display 106 as a route direction indication icon according to whether the travel direction in which the host vehicle is to travel, acquired from the route guidance information, is straight ahead, turn right, or turn left. For example, the output control unit 324 may cause the colors of foreground portions 400a, 400b, and 400c (that is, the colors of arrows (outline and hatched parts of the arrows shown)) of the route direction indication icons shown in FIGS. 4(a), 4(b), and 4(c) or the colors of background portions 402a, 402b, and 402c thereof when route guidance information is being output by the navigation function provided by the navigation unit 328 included in the navigation device to be different from those colors when route guidance information is being output by the navigation function included in the external device 102.

As a result, by merely glancing at the route direction indication icon displayed on the second display 106, the user can easily identify, from the display color of the icon, whether the route direction indication icon is based on the route guidance information provided by the navigation function included in the navigation device 100 or based on the route guidance information provided by the navigation function included in the external device 102.

When the user has input a command or data (for example, a destination or the like) through a touch screen (not shown) included in the main display 104 and/or the microphone 110, the input control unit 326 transmits the input command and/or data to the navigation unit 328 or the external device 102.

The navigation unit 328 receives positioning information from the GPS device 304 to specify the current position of the host vehicle and also acquires the destination that the user has input through the touch screen of the main display 104 or the microphone 110 and then generates and outputs route guidance information from the current position to the destination with reference to map information stored in the storage device 306.

Next, processes of the navigation device 100 will be described.

The processes include an external device detection process and an output control process 1.

The external device detection process is a process of determining whether or not there is an input (i.e., an input has been received) from the external device 102 after the external device 102 is connected to the navigation device 100 (more specifically, to the wired communication INF 302) and outputting input detection information indicating the result of the determination (i.e., indicating that "there is an input" or "there is no input"). This external device detection process is performed by the external device detection unit 322.

The output control process 1 is a process of outputting information to the main display 104, the second display 106, and the speaker 108 using either route guidance information output by the navigation unit 328 or route guidance information output by the external device 102 on the basis of the result of the external device detection process. This output control process 1 is performed by the output control unit 324.

Hereinafter, these processes will be described in order.

<External Device Detection Process>

First, the procedure of the external device detection process will be described with reference to a flowchart shown in FIG. 5. This process starts when the user powers the navigation device 100 on by operating a key of the host vehicle and is thereafter performed repeatedly at predetermined time intervals.

Upon start of the process, first, the external device detection unit 322 accesses the wired communication INF 302

(S100), determines whether or not there is an input from the external device 102 (S102), and outputs input detection information indicating the result of the determination (i.e., indicating that "there is an input" or "there is no input") (S104) and then the process ends. Whether or not there is an input from the external device 102 can be determined by detecting, for example, whether or not data has been stored in a reception buffer (not shown) of the wired communication INF 302. Note that, instead of the process flow shown in FIG. 5, the wired communication INF 302 may generate and output an interrupt signal to the processing device 300 when there is an input from the external device 102 and the external device detection unit 322 may then perform steps S102 and S104 on the basis of reception of the interrupt signal.

Output of the input detection information may also be performed, for example, by storing information indicating whether or not there is an input from the external device 102 in a predetermined storage area of a memory (not shown) of the navigation device 100 and the input detection information may be received by reading the information stored in the predetermined storage area by another unit included in the processing device 300.

<Output Control Process 1>

Next, the procedure of the output control process 1 will be described with reference to a flow chart shown in FIG. 6. This process starts when the user powers the navigation device 100 on by operating the key of the host vehicle and ends when the navigation device 100 is powered off.

Figure 5:
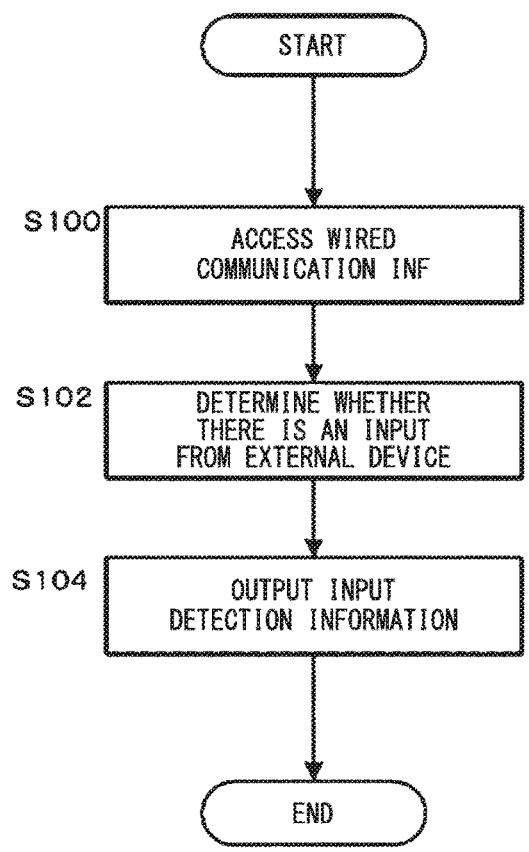
FIG. 5 is a flowchart showing a procedure of an external device detection process of the navigation device shown in FIG. 3.

Upon start of the process, first, the output control unit 324 receives the input detection information output in step S104 of the external device detection process shown in FIG. 5 (S200) and determines whether or not the received input detection information indicates that "there is an input" (S202). When the input detection information does not indicate that "there is an input" (that is, indicates that "there is no input") (S202: No), the output control unit 324 receives route guidance information from the navigation unit 328 (S204) and displays image information included in the received route guidance information on the main display 104 (S206). Further, the output control unit 324 specifies a route direction in which the host vehicle is to travel from the received route guidance information (S208) and displays a route direction indication icon indicating the route direction on the second display 106 in a predetermined default color arrangement (that is, using predetermined foreground and background colors) (S210).

When the received route guidance information includes voice guidance concerning the route to the destination, the output control unit 324 outputs the voice guidance to the speaker 108 (S212) and returns to step S200 to repeat the process.

On the other hand, upon determining in step S202 that the input detection information indicates that "there is an input" (S202: Yes), the output control unit 324 receives route guidance information output from the external device 102 via the wired communication INF 302 (S214) and displays image information included in the received route guidance information on the main display 104 (S216). Further, the output control unit 324 specifies a route direction in which the host vehicle is to travel from the received route guidance information (S218) and displays a route direction indication icon indicating the route direction on the second display 106 in a predetermined color arrangement different from the default color arrangement (S220). When the received route guidance information includes voice guidance concerning the route to the destination, the output control unit 324 outputs the voice guidance to the speaker 108 (S222) and returns to step S200 to repeat the process.

In the present embodiment, display of the route direction indication icon on the second display 106 is performed directly by the navigation device 100, but the present invention is not limited to this. For example, the second display 106 may be controlled by another display control device (for example, an electronic control unit (ECU) for speedometer display control) and the functions of the output control unit 324 may be partially separated and allocated to the display control device. In this case, for example, the output control unit 324 may issue to the display control device an instruction to or not to change the color arrangement of the route direction indication icon which is to be displayed on the second display 106 according to whether route guidance information has been output from the external device 102 or from the navigation unit 328 and the display control device may display the route direction indication icon on the second display 106 using the default color arrangement when the instruction is not to change the color arrangement and may display the route direction indication icon using a color arrangement different from the default when the instruction is to change the color arrangement.

Second Embodiment

Next, a navigation system according to a second embodiment of the present invention will be described.

In addition to having the functions of the navigation system 10 according to the first embodiment, the navigation system according to the present embodiment changes the type of voice of the voice guidance for the route to the destination output from the speaker as an output mode of route guidance information according to whether the route guidance information is provided by the navigation function included in the in-vehicle navigation device or by the navigation function included in the external device. Thus, in the navigation system of the present embodiment, the user can identify whether route guidance information is currently being provided by the in-vehicle navigation device or by the external device merely by the voice from the speaker without looking at the display.

Figure 7:
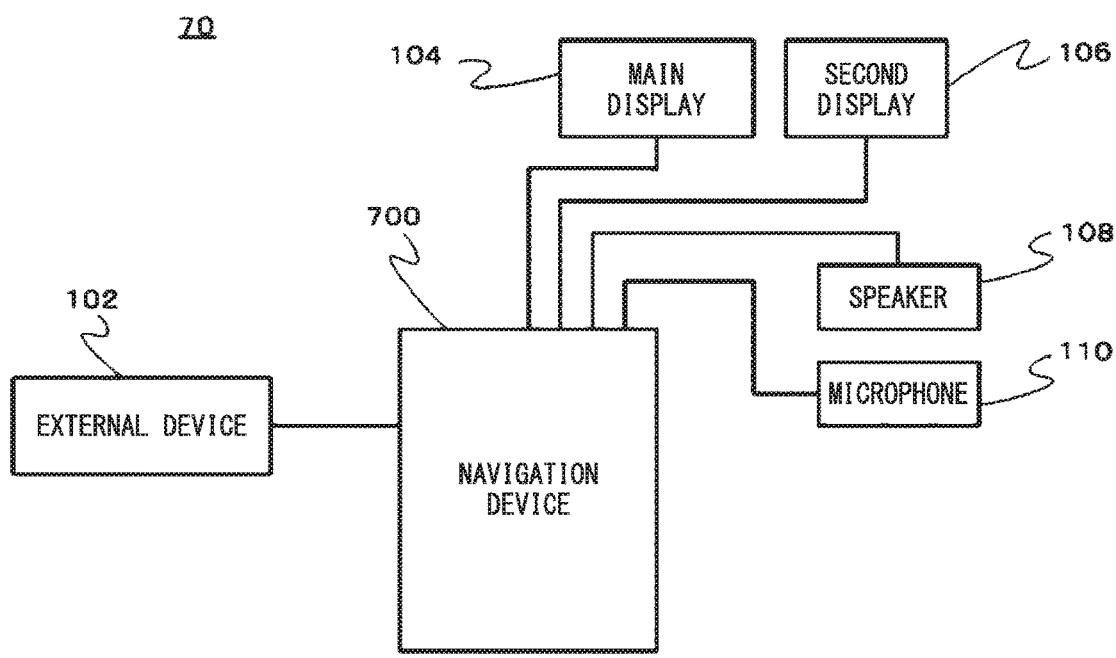
FIG. 7 is a diagram showing a configuration of a navigation system according to a second embodiment of the present invention.
Figure 8:
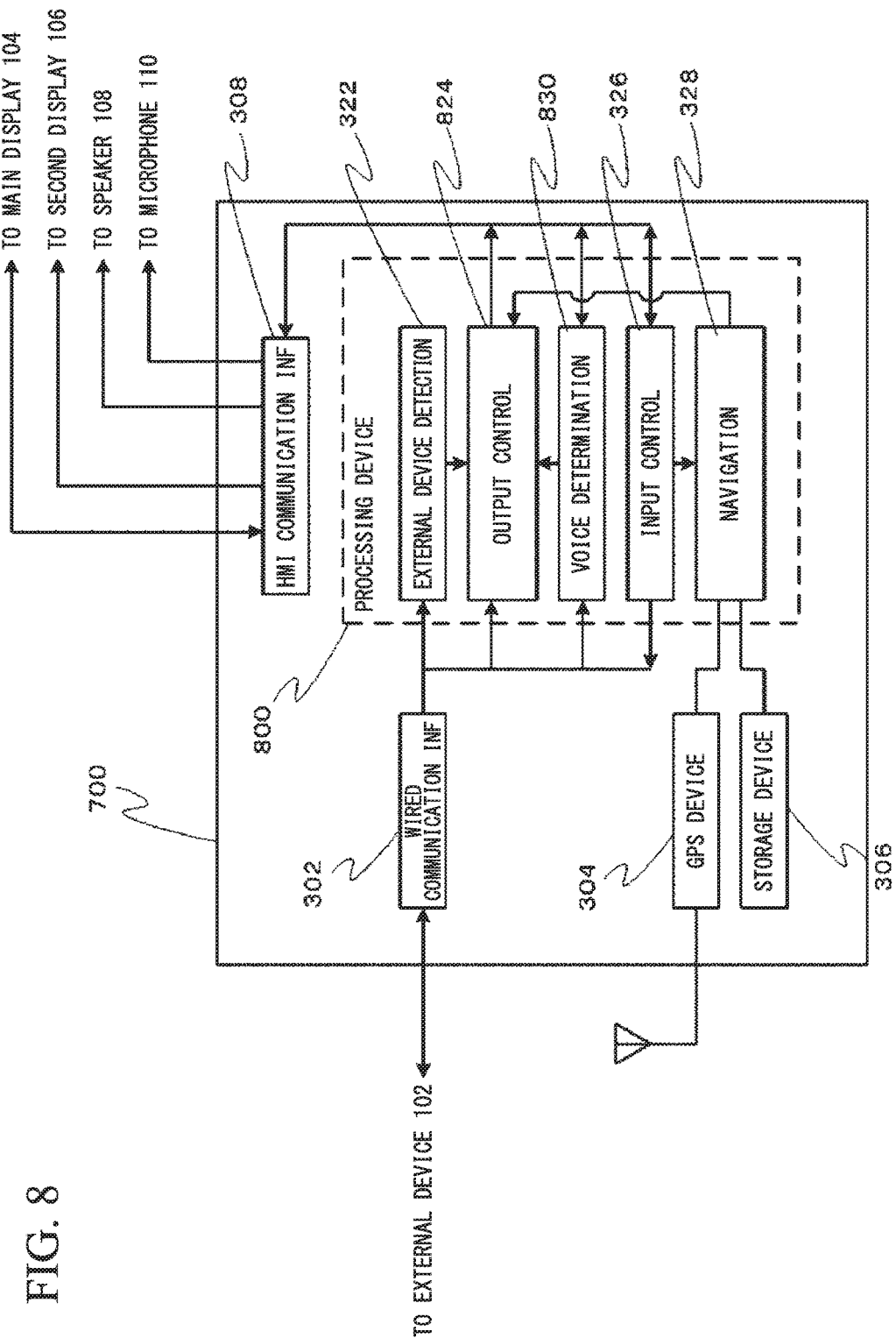
FIG. 8 is a diagram showing a configuration of a navigation device used in the navigation system shown in FIG. 7.

FIG. 7 is a diagram showing a configuration of the navigation system according to the second embodiment of the present invention and FIG. 8 is a diagram showing a configuration of a navigation device used in the navigation system shown in FIG. 7. In FIGS. 7 and 8, the same reference numerals as those of FIGS. 1 and 3 are used for the same elements as those of FIGS. 1 and 3 shown in the first embodiment and the above description of the first embodiment is employed herein.

The present navigation system 70 has a configuration similar to the first navigation system 10 with the difference that a navigation device 700 is used instead of the navigation device 100 (see FIG. 7). The navigation device 700 has a configuration similar to the navigation device 100 according to the first embodiment with the difference that the navigation device 700 includes a processing device 800 instead of the processing device 300 (see FIG. 8). The processing device 800 has a configuration similar to the processing device 300 with the difference that the processing device 800 includes an output control unit 824 instead of the output control unit 324 and further includes a voice determination unit 830.

Similar to the processing device 300, the processing device 800 is a computer having a processor such as a CPU, a ROM with a program written thereto, a RAM for temporarily storing data, and the like. Similar to other units included in the processing device 800, the output control unit 824 and the voice determination unit 830 are each realized by the processing device 800, which is a computer, executing a program. The program may be stored in any computer-readable storage medium. Similar to the processing device 300, all or some of the above units including the output control unit 824 and the voice determination unit 830 may each be formed of hardware including one or more electronic circuit parts.

The output control unit 824 has a configuration similar to the output control unit 324 according to the first embodiment. However, in addition to having the functions of the output control unit 324, when the output control unit 824 outputs voice guidance to the speaker 108 through the navigation function included in the navigation unit 328 after the voice determination unit 830 which will be described below has determined the type of voice of voice guidance from the external device 102 upon connection of the external device 102 to the navigation device 700, the output control unit 824 outputs the voice guidance to the speaker 108 in a voice of a different type from the determined type of voice of the voice guidance output by the external device 102.

The voice determination unit 830 determines the type of voice of voice guidance output from the external device 102. Here, "type of voice" indicates whether the voice is a "male voice" or a "female voice" in the present embodiment.

In particular, when the voice determination unit 830 can acquire voice data of voice guidance output by the external device 102 from the external device 102 via the wired communication INF 302, the voice determination unit 830 determines the type of voice of the voice guidance by analyzing the acquired voice data. On the other hand, when the voice determination unit 830 cannot acquire voice data of voice guidance output by the external device 102 from the external device 102 via the wired communication INF 302, the voice determination unit 830 detects the voice guidance, which is output through the speaker 108, by the microphone 110 and determines the type of voice of the voice guidance by analyzing voice data of the detected voice guidance acquired by the microphone 110. Here, the expression "when the voice determination unit 830 cannot acquire voice data of voice guidance output by the external device 102 from the external device 102 via the wired communication INF 302" indicates, for example, the case in which an earphone jack (not shown) included in the external device 102 and a line input (not shown) included in the navigation device 700 are connected to each other such that the voice guidance is directly output to the speaker 108 without going through the processing device 800.

Next, processes of the navigation device 700 will be described.

The processes include an external device detection process, a voice determination process, and an output control process 2. Among the processes, the external device detection process is the same as the external device detection process according to the first embodiment shown in FIG. 5 and the above description of the external device detection process is employed herein.

The voice determination process is a process of specifying the type of voice of the voice guidance output from the external device 102 and changing the setting of a voice (hereinafter referred to as a "native voice") used to output the voice guidance to the speaker 108 through the navigation function included in the navigation unit 328 to a voice of a different type from the specified type of voice. This voice determination process is performed by the voice determination unit 830.

Figure 6:
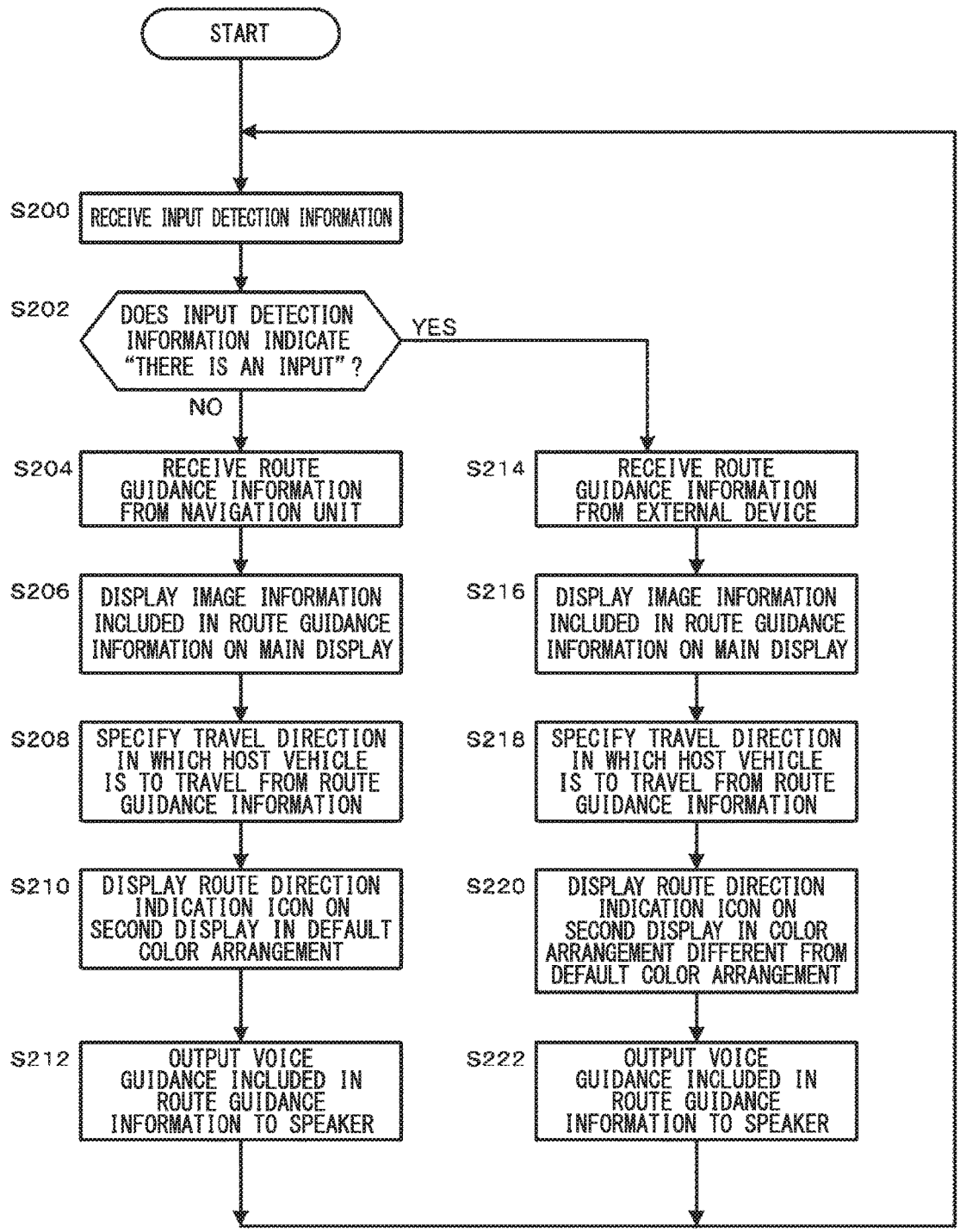
FIG. 6 is a flowchart showing a procedure of an output control process 1 of the navigation device shown in FIG. 3.

The output control process 2 is similar to the output control process 1 according to the first embodiment shown in FIG. 6 with the difference that, instead of the step S212 of outputting the voice guidance included in the route guidance information received from the navigation unit 328 to the speaker 108 without alteration, the type of the native voice set in the voice determination process is referred to and the voice guidance is output to the speaker 108 in a voice of the type set for the native voice.

Hereinafter, the procedures of the voice determination process and the output control process 2 will be described in order.

<Voice Determination Process>

The procedure of the voice determination process will be described below with reference to the flow chart shown in FIG. 9. This process starts when the user powers the navigation device 100 on by operating the key of the host vehicle and ends when the navigation device 100 is powered off.

Upon start of the process, first, the voice determination unit 830 receives the input detection information output in step S104 of the external device detection process shown in FIG. 5 (S300) and determines whether or not the input detection information has changed from "there is no input" to "there is an input" (S302). This determination can be performed by storing previously received input detection information and comparing the previously received input detection information with the input detection information received at this time.

When the input detection information has not changed from "there is no input" to "there is an input" (S302: No), the process returns to step S300 to repeat the process. On the other hand, when the input detection information has changed from "there is no input" to "there is an input" (S302: Yes), the voice determination unit 830 determines whether or not the external device 102 is configured such that audio data can be imported from the external device 102 into the processing device 800 via the wired communication INF 302 (S304). This determination can be made, for example, by previously storing an association table, in which respective model codes of various external devices that may be connected to the navigation device 700 are each associated with information indicating whether or not a corresponding external device is configured as described above, in a storage device (not shown) included in the processing device 800 and acquiring a model code of an external device 102 when the wired communication INF 302 has established communication with the external device 102, and then the voice determination unit 830 referring to the table on the basis of the acquired model code.

Then, when the external device 102 is configured such that audio data can be imported from the external device 102 into the processing device 800 (S304: Yes), the voice determination unit 830 analyzes voice data of the voice guidance output from the external device 102 to specify the type of the voice guidance (S306). Specifically, the type of the voice may be specified, for example, by specifying whether the voice is "male voice" or "female voice."

Then, the voice determination unit 830 determines whether or not the type of voice of the voice guidance from the external device 102 is a female voice (S308). When the type of voice is a female voice (S308: Yes), the voice determination unit 830 sets the type of the native voice to "male voice" (S310) and returns to step S300 to repeat the process. The setting of the native voice may be performed by writing information indicating the type of the native voice to a predetermined storage area of a storage device (not shown) included in the processing device 800. This allows the output control unit 824 to acquire the setting of the type of the native voice by reading the information indicating the type of the native voice written to the storage area.

On the other hand, upon determining in step S308 that the type of voice of the voice guidance from the external device 102 is not a female voice (S308: No), the voice determination unit 830 sets the type of the native voice to "female voice" (S312) and returns to the step S300 to repeat the process.

On the other hand, upon determining in step S304 that the external device 102 is not configured such that audio data can be imported from the external device 102 into the processing device 800 (S304: No), the voice determination unit 830 acquires a voice of the voice guidance, which the external device 102 outputs through the speaker 108, by the microphone 110 (S314) and then analyzes the acquired voice to specify the type of voice of the voice guidance from the external device 102 (S316). Subsequently, the voice determination unit 830 shifts the process to step S308 and sets the type of the native voice to a "male voice" or a "female voice" according to whether or not the specified type of voice of the voice guidance from the external device 102 is a "female voice" (steps S308 to S312) and returns to step S300 to repeat the process.

In the voice determination process shown in FIG. 9, the type of a voice output from the external device 102 is determined only once, but the present invention is not limited to this and the type of the voice may be specified a plurality of times and the type of the native voice may be set only when the same specification result is obtained consecutively a predetermined number of times.

The analysis of the voice acquired by the microphone 110 in step S316 may be performed only when it is determined that the voice has a feature of voice of the voice guidance, for example, using a dedicated voice recognition engine.

<Output Control Process 2>

Next, the procedure of the output control process 2 will be described with reference to the flow chart shown in FIG. 10. In FIG. 10, the same processing steps as in the output control process 1 shown in FIG. 6 are denoted by the same reference numerals as those of FIG. 6 and the above description of FIG. 6 is employed herein. Thus, the procedure of the output control process 2 will be described below only for parts different from the output control process 1 shown in FIG. 6.

In the output control process 2, after displaying the route direction indication icon on the second display 106 in the default color arrangement in step S210, the output control unit 824 acquires the setting of the type of the native voice which was set in step S310 or S312 of the voice determination process shown in FIG. 9 (S400) and outputs the voice guidance included in the route guidance information output by the navigation unit 328 to the speaker 108 in a voice of the type set for the native voice (S402) and then returns to step S200 to repeat the process.

In the processing in step S402, it is possible to output voice guidance of a "male voice" or a "female voice" according to the type set for the native voice using various known techniques. For example, it is possible to convert the voice of the voice guidance into a voice having a characteristic acoustic frequency spectrum of a male voice or a female voice and to output the converted voice to the speaker 108 or it is possible to generate a guide voice by a male voice or a female voice according to the voice type set for the native voice using a voice synthesis method and to output the generated guide voice. It is also possible to select a guide voice, from those which have been previously recorded using a male voice and a female voice, according to the voice type set for the native voice.

As described above, in the first and second embodiments described above, the navigation device 100 or 700 includes the external device detection unit 322 that detects an input from the external device 102 connected to the navigation device and the output control unit 324 or 824 that controls output of route guidance information to the displays 104 and 106 and the speaker 108 which are HMI devices. Route guidance information provided either by the navigation function included in the navigation device or by the navigation function included in the external device is selectively output to the HMI devices. Here, when the external device detection unit 322 has detected an input from the external device 102, the output control unit 324 or 824 outputs the route guidance information provided by the navigation function included in the external device 102 to the HMI devices in an output mode (for example, with a color arrangement of the route direction indication icon or with a voice type of the voice guidance) different from when route guidance information is output to the HMI devices by the navigation function included in the navigation device.

As a result, by merely glancing at the route direction indication icon displayed on the second display 106 or by listening to the voice guidance output through the speaker 108, the user can easily identify whether the currently provided route guidance information is provided by the navigation function included in the navigation device 100 or 700 or by the navigation function included in the external device 102.

In the first and second embodiments described above, the external device 102 and the navigation device 100 or 700 are connected to each other in a wired manner via a communication bus, but the present invention is not limited to this and the external device 102 and the navigation device 100 or 700 may have respective transceivers for wireless communication and may be connected to each other via wireless communication such as Wi-Fi.

REFERENCE SIGNS LIST 10, 70 Navigation system
100, 700 Navigation device
102 External device
104 Main display
106 Second display
108 Speaker
110 Microphone
200 Steering wheel
202 Dashboard
204 Speedometer
206 Display
208 Front windshield
210 Head-up display
300, 800 Processing device
302 Wired communication INF
304 GPS device
306 Storage device
308 HMI communication INF
322 External device detection unit
324, 824 Output control unit
326 Input control unit
328 Navigation unit
830 Voice determination unit.

The invention claimed is:

1. A navigation system including a navigation device provided on a vehicle and configured to output route guidance information to a human-machine interface (HMI) device and an external device having a navigation function connected to the navigation device, the navigation device comprising:
   an external device detection unit configured to detect an input from the external device; and
   an output control unit configured to control output of route guidance information to the HMI device,
   wherein the route guidance information includes a direction guidance indicator for a travel direction of the vehicle,
   the output control unit is configured to selectively output route guidance information provided either by a navigation function included in the navigation device or by the navigation function included in the external device to the HMI device, and
   when the external device detection unit has detected an input from the external device, the output control unit is configured to output the direction guidance indicator provided by the navigation function included in the external device to the HMI device in an output mode different from when the direction guidance indicator is output to the HMI device by the navigation function included in the navigation device.

2. The navigation system according to claim 1, wherein the output control unit is configured to control a color arrangement of the direction guidance indicator as the output mode,
   the navigation device further comprises a color arrangement determination unit configured to determine whether or not the color arrangement is to be changed, and
   the color arrangement determination unit is configured, when the route navigation information is based on the external device, to change the color arrangement from a first color arrangement to a second color arrangement, that is used when the direction guidance indicator is output to the HMI device by the navigation function.

3. The navigation system according to claim 1, wherein the HMI device includes a speaker,
   the route guidance information includes voice guidance concerning a route to a destination,
   the output mode is a type of voice used to output the voice guidance to the speaker, and
   the output control unit is configured to output the voice guidance provided by the navigation function included in the external device to the speaker using a voice of a different type from when the voice guidance provided by the navigation function included in the navigation device is output to the speaker.

4. The navigation system according to claim 3, wherein the navigation device includes a voice determination unit configured to determine a type of voice of the voice guidance output by the external device connected to the navigation device, and
   when the output control unit outputs the voice guidance to the speaker through the navigation function included in the navigation device after the voice determination unit has determined a type of voice of the voice guidance output by the external device upon connection of the external device to the navigation device, the output control unit is configured to output the voice guidance to the speaker in a voice of a different type from the determined type of voice of the voice guidance output by the external device.

5. The navigation system according to claim 4, wherein the HMI device includes a microphone, and
   the voice determination unit is configured to detect the voice guidance, which the external device connected to the navigation device outputs through the speaker, by the microphone and to determine that a type of voice of the detected voice guidance is a type of voice of the voice guidance output by the external device.

6. The navigation system according to claim 3, wherein the HMI device includes a microphone, and
   the voice determination unit is configured to detect the voice guidance, which the external device connected to the navigation device outputs through the speaker, by the microphone and to determine that a type of voice of the detected voice guidance is a type of voice of the voice guidance output by the external device.

7. A vehicle including the navigation system according to claim 1.

8. The navigation system according to claim 1, wherein the HMI device includes a first display device configured to display detailed route guidance information, and a second display device provided at a position such that a driver can view display content on the second display without looking into a distance, away from a road in front of the vehicle, as compared to the first display device, and
   the output control unit is configured to
      display image information, on the first display device, included in the route guidance information provided by the navigation function included in the navigation device or provided by the navigation function included in the external device, and
      display the direction guidance indicator, on the second display device, with a first color when the direction guidance indicator is based on the route navigation information provided by the navigation function included in the navigation device or with a second color that is different from the first color when the direction guidance indicator is based on the route navigation information provided by the navigation function included in the external device.

9. A navigation device having a function of selectively outputting a navigation function included in an external device connected to the navigation device and a navigation function included in the navigation device to a human-machine interface (HMI) device, the navigation device comprising:
   an external device detection unit configured to detect an input from the external device; and
   an output control unit configured to control output of route guidance information to the HMI device,
   wherein the route guidance information includes a direction guidance indicator for a travel direction of the vehicle,
   the output control unit is configured to selectively output route guidance information provided either by a navigation function included in the navigation device or by the navigation function included in the external device to the HMI device, and
   when the external device detection unit has detected an input from the external device, the output control unit is configured to output the direction guidance indicator provided by the navigation function included in the external device to the HMI device in an output mode different from when the direction guidance indicator is output to the HMI device by the navigation function included in the navigation device.

10. A vehicle including the navigation device according to claim 9.

11. The navigation device according to claim 9, wherein
the output control unit is configured to control a color arrangement of the direction guidance indicator as the output mode,
the navigation device further comprises a color arrangement determination unit configured to determine whether or not the color arrangement is to be changed, and
the color arrangement determination unit is configured, when the route navigation information is based on the external device, to change the color arrangement from a first color arrangement to a second color arrangement, that is used when the direction guidance indicator is output to the HMI device by the navigation function.

12. The navigation system according to claim 9, wherein
the HMI device includes a first display device configured to display detailed route guidance information, and a second display device provided at a position such that a driver can view display content on the second display without looking into a distance, away from a road in front of a vehicle, as compared to the first display device, and
the output control unit is configured to
display image information, on the first display device, included in the route guidance information provided by the navigation function included in the navigation device or provided by the navigation function included in the external device, and
display the direction guidance indicator, on the second display device, with a first color when the direction guidance indicator is based on the route navigation information provided by the navigation function included in the navigation device or with a second color that is different from the first color when the direction guidance indicator is based on the route navigation information provided by the navigation function included in the external device.

\* \* \* \* \*